Patented July 30, 1929.

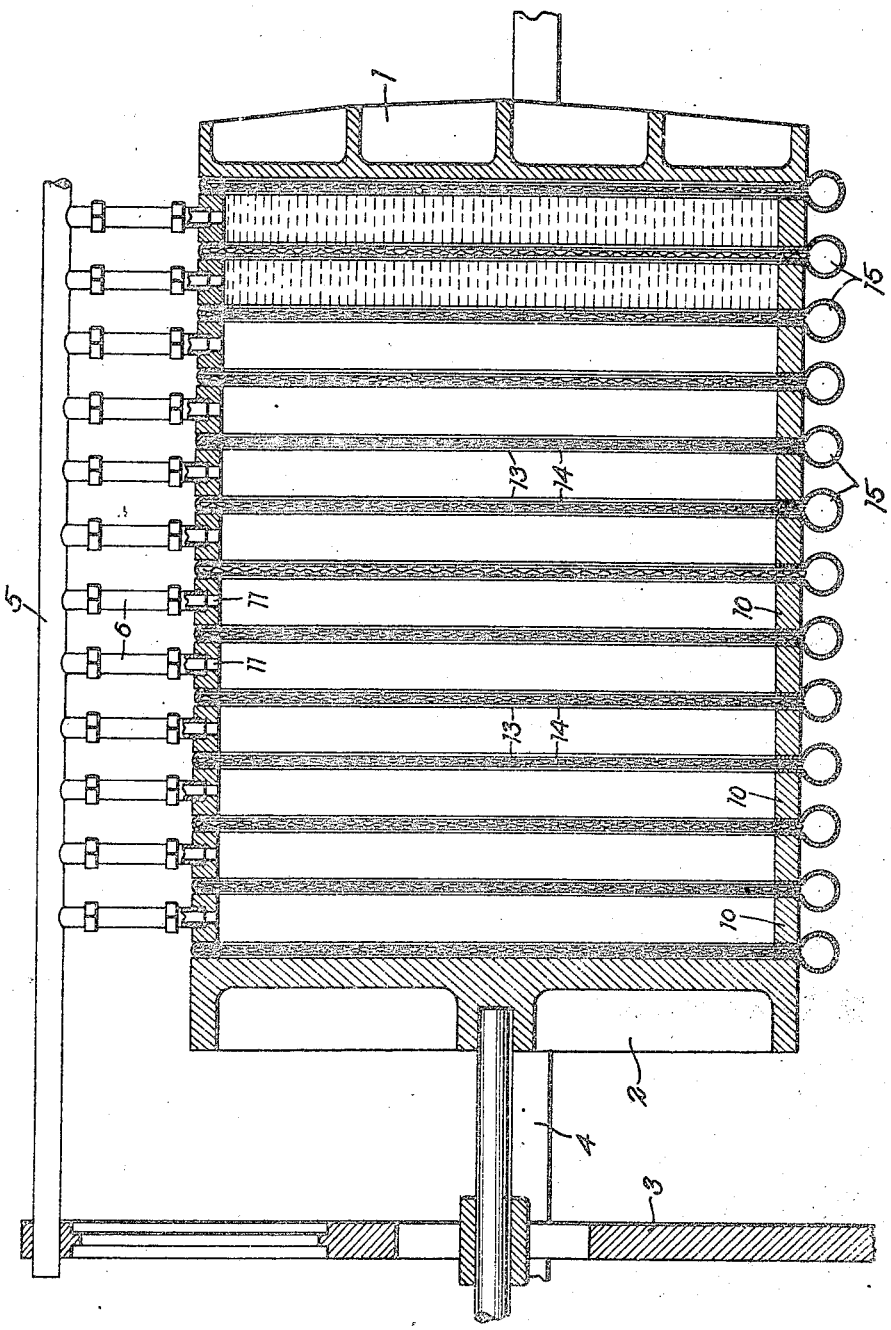

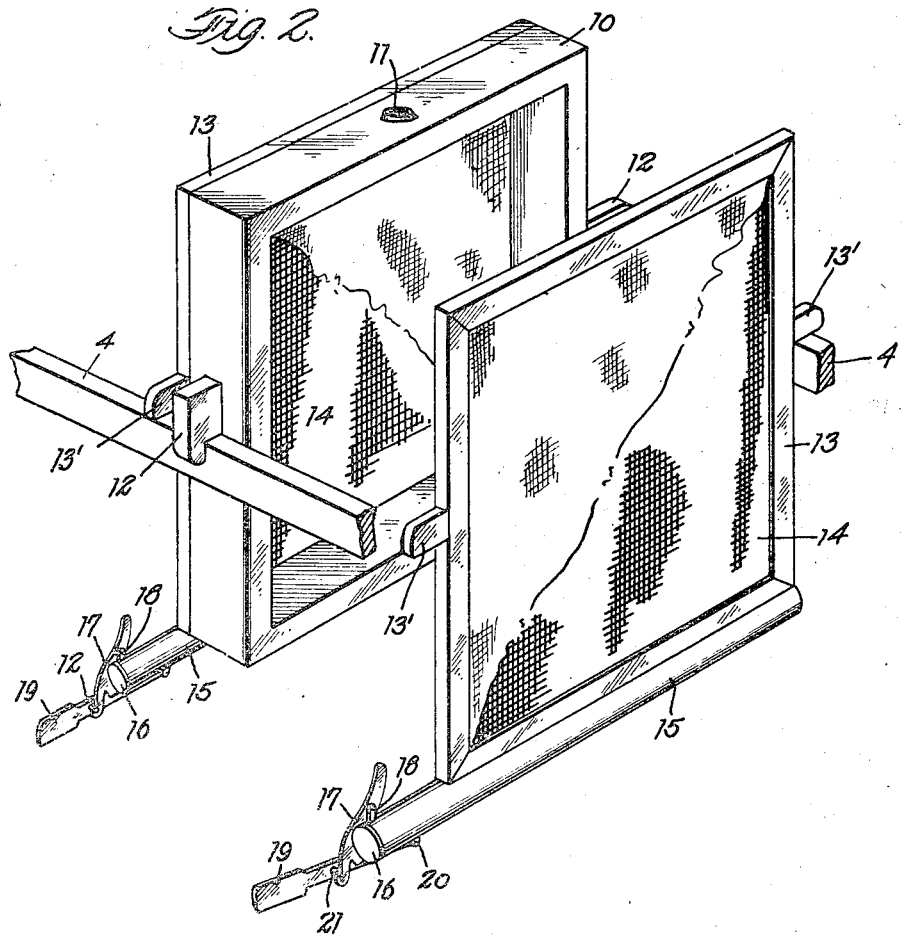
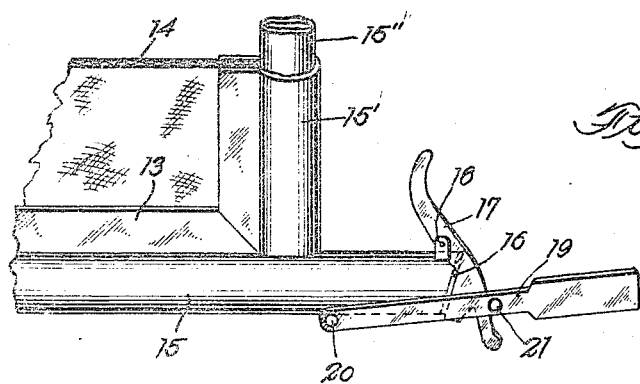

1,722,497

UNITED STATES PATENT OFFICE.

JOHN PRESTON FOSTER, OF PAIA, MAUI, TERRITORY OF HAWAII.

FILTER PLATE.

Application filed October 18, 1927. Serial No. 226,896.

The invention relates to filtering elements or plates for filter presses and has for its object to provide a plate of the character described to materially reduce the size and weight of the press and increase the capacity of the apparatus, which results are attained by constructing the plates with a retaining frame formed of channel sections of relatively light, thin material, preferably sheet metal, the bottom channel section being provided with a tubular extension beyond the normal marginal edge of the frame to constitute an enlarged collection and discharge conduit, said extension being provided at one end with a suitable valve, the channel members of the frame embracing and retaining the marginal edges of a screen mounted in and filling the frame and constituting a support for the filtering fabric applied to opposite sides of the plate, in the usual manner, so that, when a series of plates so constructed are interposed between the usual frame members of a filter press, said plates will occupy a minimum of space and the enlarged tubular extensions of the channel sections of the plates will provide collection and discharge conduits of maximum capacity and the individual plates will possess inherent strength and durability far in excess of the usual type of cast metal plates employed for this purpose.

Referring to the drawings

Fig. 1 is a lateral sectional elevation of a typical filter press embodying the invention.

Fig. 2 is a partial perspective of a single frame and two associated filter plates or elements.

Fig. 3 is a fragmentary perspective of a modified form of filter plate.

Referring to the drawings, 1 and 2 indicate the end sections of a conventional filter press, mounted in the usual frame 3, which carries the side bars 4, upon which the end members, the frames and the filter plates are supported, the filter press, in the present instance, being of the top feed type in which the material to be filtered is supplied to the individual spaces within the frame 10 by means of a manifold 5, which is connected to the top openings in the frames 10 by supply pipes 6, fitted with the usual couplings to facilitate assembling and dismounting the parts of the press.

The frames 10 are of the usual type consisting of open box-like structures provided with lateral lugs 12, which engage the side bars 4 of the press frame, as illustrated in Fig. 2.

Each of the filter plates or filtering elements per se is constructed and arranged to be engaged and clamped between two of the filter frames 10 in the usual manner. Ordinarily, these filter plates are made of cast iron having ribbed or corrugated lateral faces to support the filtering fabric and, in order to impart sufficient strength to these plates, it is necessary to make them of relatively heavy castings, which are generally of the same approximate thickness as the intervening frames. This excessive thickness of the supporting members of the filter plate is necessary in order to provide sufficient space to form a cored channel in the metal to provide a discharge for the liquids, as well as means for attachment of a faucet to the lower edge of each plate.

As hereinbefore indicated, the present invention is primarily designed to avoid the objectionable features of the standard types of filter plates or elements, also to decrease the size and increase the capacity of a press. To these ends, each of the filter plates or elements comprise an open frame 13, the several sides of which are formed of channel sections of relatively thin material, preferably sheet metal, which is not subject to corrosion, or which may be protected from corrosive effects by a coating of suitable material, the inwardly opening channels receiving and clamping between the flanged members thereof a supporting screen 14, which may be of wire mesh, which completely fills the space within the frame 13 and is held against displacement by the clamping action of the channel flanges. If desired, the screen may be covered on each side with a filtering fabric, but, ordinarily, the fabric, in the form of cloth, paper or the like, is interposed between the abutting faces of each filter plate and the adjacent filter frames 10, as will be understood.

As illustrated in Figs. 1 and 2, the lower channel section of each plate is provided with an enlarged tubular extension 15, which projects beyond the normal marginal edge of the frame and, therefore, does not interfere with the effective engagement of the lateral faces of the filter frames 10 and the plate frames 13, said tubular extension running longitudinally of the bottom of the channel section and preferably projecting beyond one lateral edge of the frame 13 to constitute a support for a valve to control the discharge of the filtered liquid collecting in the tubular extension 15.

The side channel members of the frame 13 are provided with supporting lugs 13', 13', which may be formed either integrally with the channel sections or secured thereto by any suitable means, such as spot welding, said lugs constituting the supports for the individual filter plates on the rails 4.

As illustrated in the drawings, a convenient type of valve or faucet for controlling the discharge of the liquid collecting in the tubular extension or conduit 15 comprises a flap valve 16, adapted to engage the open end of the tubular extension 15, said flap valve being secured to a curved lever 17, which is pivoted on a lug 18 welded to the tubular extension 15, the said lever being actuated to open and close the valve by handle 19 pivoted to a lug 20, welded to the under side of the extension 15, said handle 19 carrying a roller 21 on one face, which roller engages the curved edge of the lever 17 and swings the latter on its pivotal connection to effect both the opening and closing movements of the flap valve 16.

It will be noted that, when the requisite number of plates and frames are assembled, the length of the filter press, as a whole, will be materially reduced, because of the reduction in the thickness of the individual filter plates, and, at the same time, decidedly increasing the capacity of the press, as the filtered liquid flows freely into the discharge conduits formed by the tubular enlargements 15, whence it is discharged by opening the valves or faucets.

In some instances, it may be found desirable to increase the capacity of the discharge conduits, in which case two or more of the channel sections may be provided with the tubular enlargements and such a modification of the structure is illustrated in Fig. 3, in which 15' illustrates a tubular enlargement formed on one of the side channel members of which the filter plate frame is composed, said enlargement 15' opening into the bottom enlargement 15. Preferably, this lateral discharge conduit or enlargement 15' may be interrupted in part to receive a tubular section 15" of glass or the like, which constitutes a gauge or sight glass.

While the invention has been illustrated as applied to a top supply filter press, it will be understood that this illustration is merely exemplary and that the new form of filter plate or element is adapted to any of the standard types of filter presses.

The salient advantages of the instant invention are, as hereinbefore indicated, the increased capacity of the press, or, in the alternative, a materially decreased floor space for a press of given capacity, better drainage of the filtrate and consequent increase of efficiency, large reduction in weight of the press and, therefore, an increased facility of assemblage and operation of the press, decreased danger of breakage of the parts and a corresponding reduction in the expense of maintenance and an increase in the continuity of operation.

What I claim is:

1. In a filter press, frame members, and filter plates interposed between said frame members composed of channel sections of thin material, the bottom channels having enlarged tubular extensions positioned exterior to said frame members and forming discharge conduits, and supporting screens filling the plates with the edges of said screens confined within said channel sections.

2. In a filter press, frame members, and filter plates interposed between said frame members composed of channel sections of thin material, the bottom channels having enlarged tubular extensions positioned exterior to said frame members and forming discharge conduits, valves at the ends of said extensions, and supporting screens filling the plates with the edges of said screens confined within said channel sections.

3. In a filter press, frame members, and filter plates interposed between said frame members composed of channel sections of sheet metal, the bottom channels having enlarged tubular extensions positioned exterior to said frame members and forming discharge conduits, and supporting screens filling plates with the edges of said screens confined within said channel sections.

4. In a filter press, frame members, and filter plates interposed between said frame members composed of channel sections of sheet metal, at least one of said channel sections of each plate having an enlarged tubular extension positioned exterior to said frame members and forming a discharge conduit, and supporting screens filling the plates with the edges of said screens confined within said channel sections.

5. In a filter press, frame members, and filter plates interposed between said frame members composed of channel sections of sheet metal, at least one of said channel sections of each plate having an enlarged tubular extension positioned exterior to said frame members and forming a discharge conduit, a valve at the end of each extension, and supporting screens filling the plates with the edges of said screens confined within said channel sections.

In testimony whereof I affix my signature.

JOHN PRESTON FOSTER.